324-077. XR 3557354 SR

[11] 3,557,354

[72] Inventor Charles R. Trimble
Palo Alto, Calif.
[21] Appl. No. 1,581
[22] Filed Jan. 9, 1970
Division of Ser. No. 557,167, June 13, 1966, Patent No. 3,506,813.
[45] Patented Jan. 19, 1971
[73] Assignee Hewlett-Packard Company
Palo Alto, Calif.
a corporation of California

[54] SIGNAL-TO-NOISE RATIO ENHANCEMENT METHODS AND MEANS

2 Claims, 2 Drawing Figs.

[52] U.S. Cl. .......... 235/152, 128/2.1, 324/77
[51] Int. Cl. .......... G06f 15/00, G06f 15/34
[50] Field of Search .......... 235/152; 128/2.1; 324/77B, 77J

[56] References Cited
UNITED STATES PATENTS
3,087,487 4/1963 Clynes .......... 128/2.1
3,388,377 6/1968 Folsom et al. .......... 340/146.1

*Primary Examiner*—Malcolm A. Morrison
*Assistant Examiner*—James F. Gottman
*Attorney*—Roland I. Griffin

ABSTRACT: A selected interval of a recurring input signal is repetitively sampled in amplitude at the same time positions during successive signal averaging cycles. During the first signal averaging cycle the amplitude sample obtained at each of these time positions is processed as an average of one recurrence of the portion of the selected input interval occurring at that time position and is stored in a memory channel associated with that time position. During each succeeding signal averaging cycle the difference in amplitude between each amplitude sample and the average stored in the associated memory channel during the preceding signal averaging cycle is divided by a selected factor, and the quotient is algebraically added as a correction factor to the average stored in the associated memory channel during the preceding signal averaging cycle to update that average. This may be accomplished for each time position of each sweep by shifting a number indicative of the average stored during the preceding sweep in the associated memory channel *x* places in an accumulator, adding by signed counting a number indicative of the difference in amplitude between the amplitude sample obtained at that time position and the average stored during the preceding sweep in the associated memory channel to the shifted number in the accumulator, shifting the resultant number back *x* places in the accumulator to provide a corrected average for that time position, and storing the corrected average in the associated memory channel.

INVENTOR
CHARLES R. TRIMBLE
BY Roland D. Griffin
ATTORNEY

INVENTOR
CHARLES R. TRIMBLE
BY Roland I. Griffin
ATTORNEY

SIGNAL-TO-NOISE RATIO ENHANCEMENT METHODS AND MEANS

CROSS-REFERENCE TO RELATED APPLICATION

This is a divisional application of U.S. Pat. application Ser. No. 557,167, now U.S. Pat. No. 3,506,813, entitled SIGNAL-TO-NOISE RATIO ENHANCEMENT METHODS AND MEANS and filed on June 13, 1966, by Charles R. Trimble.

BACKGROUND AND SUMMARY OF THE INVENTION

This invention relates to methods and means for enhancing the signal-to-noise ratio of an electrical input so as to clearly differentiate the signal component of the input from the noise component and thereby permit measurement of the signal component.

There are many situations in which a signal of interest is contained within an electrical input having a heavy noise component originating either in the electrical system or at the point of signal origin. When the signal-to-noise ratio is so unfavorable that the signal component of the input cannot be readily differentiated from the noise component even by visual inspection, the signal component cannot be accurately represented by a single occurrence of the input. The average of a number of recurrences of the input more accurately represents the signal component than any single occurrence of the input because the signal component contributes consistently to the average while the unrelated noise component adds to or subtracts from the average. Thus, the signal-to-noise ratio of the input may be enhanced by averaging a number of recurrences of the input, and the signal component may be accordingly measured with a precision related to the degree of the signal-to-noise ratio enhancement. For an input including a constant noise component having a gaussian distribution the enhancement in signal-to-noise ratio is proportional to the square root of the number of recurrences of the input that are averaged. One conventional technique utilizing this principle to enhance the signal-to-noise ratio of an input comprises repetitively generating the input and continuously measuring and adding the inputs as they occur so as to provide the sum of all the inputs. See U.S. Pats. No. 3,087,487 However, this summing technique has several disadvantages. For example, in some cases the sums may build up to size in excess of the capacity of the memory. Moreover, since the output display continuously grows during the summing process a stable, online full-scale display is not provided with this summing technique. Thus, a range switch must be adjusted throughout the summing process to maintain the output display on scale.

Accordingly, it is the principal object of this invention to provide feedback averaging methods and means for enhancing the signal-to-noise ratio of an electrical input while providing a stable calibrated output display throughout the averaging process. The only change in the output display as the averaging process proceeds is due to attenuation of the noise component of the input.

This object is accomplished in accordance with the illustrated embodiments of this invention by repetitively sampling a selected interval of an input at the same time positions in that interval. Each repetitive set of samplings of the selected interval of the input is hereinafter referred to as a sweep. The data signal obtained from each sampling of the first sweep is stored as an average of one in a memory channel associated with the time position of that sampling. In response to each sampling of each subsequent sweep a difference signal is produced indicating the difference between the input at the time position of that sampling and the average signal stored in the associated memory channel during the preceding sweep. Each difference signal is divided by a selected factor and the resultant quotient signal is then algebraically added to the average signal stored in the associated memory channel during the preceding sweep so as to store a corrected average in that associated memory channel. This may be accomplished for each time position of each sweep by shifting the average signal stored in the associated memory channel during the preceding sweep $x$ places in an accumulator, adding by signed counting the difference signal produced for that time position to this shifted average signal, shifting the resultant signal back $x$ places in the accumulator to provide a corrected average signal for that time position, and storing this corrected average signal in the associated memory channel. The full-scale output display of the selected interval of the input appears during the second sweep and is not changed during the feedback averaging process except to the extent of the attenuation of the noise component.

DESCRIPTION OF THE PREFERRED EMBODIMENTS

Figure 1:
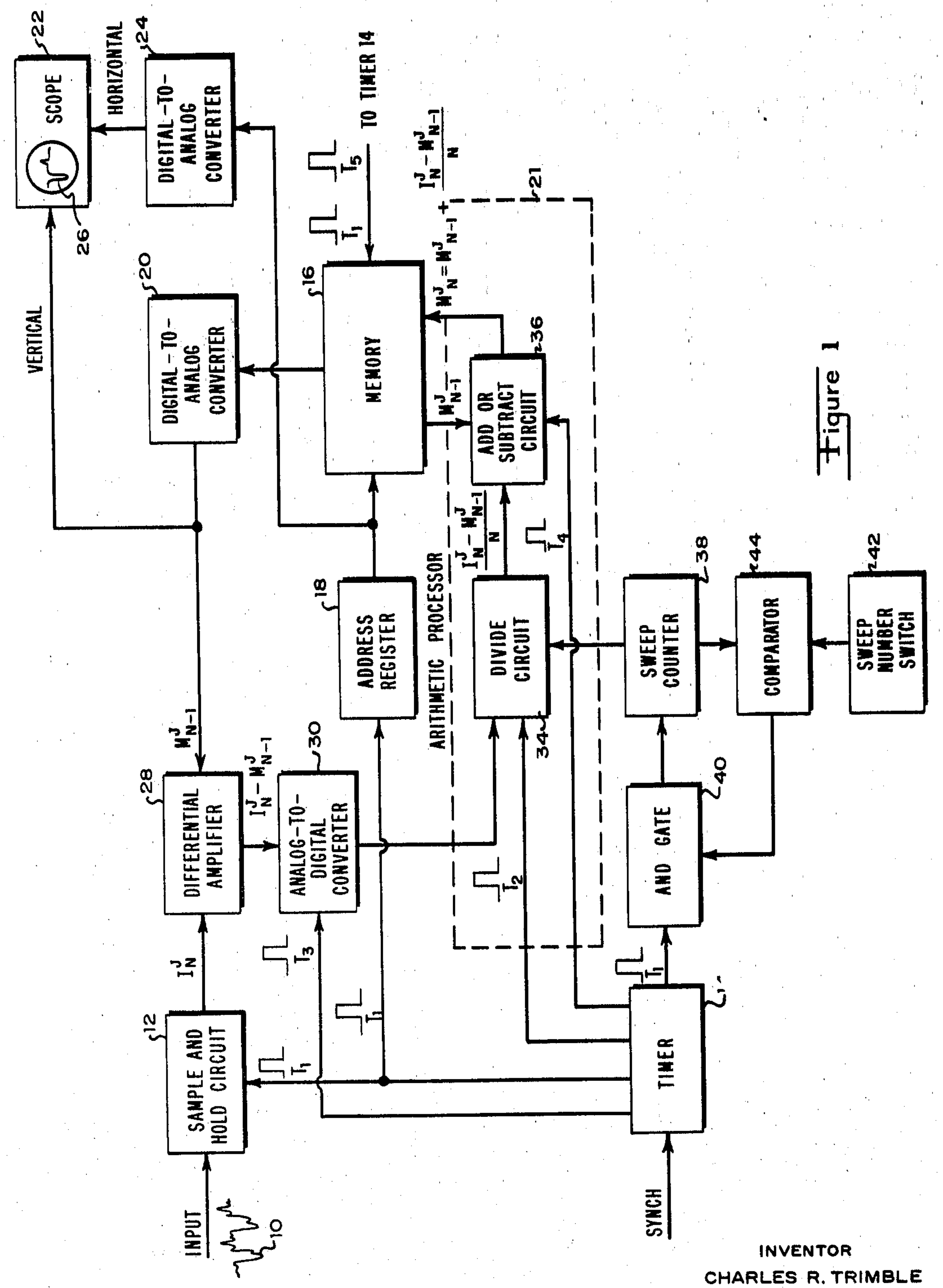
FIG. 1 is a block diagram of a feedback averaging system for enhancing the signal-to-noise ratio of an electrical input according to one embodiment of this invention.

Referring to FIG. 1, there is shown a recurring electrical input waveform 10 which a signal component of interest is embedded in a heavy background noise component. This recurring input waveform 10 is applied to a sample and hold circuit 12 which is responsive to successively applied timing pulses for repetitively sampling each recurrence of the input waveform to produce an analogue data signal for each sampling. The amplitude of each of these data signals is indicative of the amplitude of the input waveform 10 at the time position of the corresponding sampling, and the duration of each data signal is sufficient to permit processing of the data signal produced by that sampling before the occurrence of the next sampling. A timer 14 is driven in synchronism with the input waveform 10 for generating timing pulses at the same time positions in each recurrence of the input waveform. The timer 14 is connected for supplying selected ones of these timing pulses to the sample and hold circuit 12 so as to cause it to sample at the same successive time positions a sufficient number of recurrences of the input waveform 10 to provide an output display of the input waveform with the desired degree of signal-to-noise ratio enhancement.

A multiple channel memory 16 is provided comprising a series of consecutive memory addresses, each of which corresponds to a different one of the sampling time positions. An address register 18 is connected to the memory 16 and is responsive to the timing pulses generated by the timer 14 and supplied to the sample and hold circuit 12 for selecting the memory address associated with the time position of each sample as that sample is being processed. The memory 16 is responsive to these same timing pulses for supplying a digital signal representing the contents of each memory address as it is selected by the address register 18 to a digital-to-analog converter 20 and to an arithmetic processor 21. Memory 16 is responsive to still other timing pulses from the timer 14 for storing the information provided by a signal at the output of the arithmetic processor 21 back in the selected memory address.

The data signal obtained from each sampling of the first sweep of the input waveform 10 is processed so that the amplitude information of the data signal is stored as an average of one in the memory address associated with the time position of that sampling. As each memory address is selected during each sampling of each subsequent sweep a digital average signal indicative of the average stored in that memory address during the preceding sweep is supplied from the memory 16 to the digital-to-analog converter 20 where it is converted to an equivalent analogue average signal. The digital-to-analog converter 20 is connected to the vertical input of an oscilloscope 22 for supplying each analogue average signal thereto. A digital-to-analog converter 24 is also connected intermediate to the output of the address register 18 and the horizontal input of the oscilloscope 22 for converting each digital output of the address register to an equivalent analogue signal which serves as the time base for the corresponding analogue average signal supplied to the vertical input. Thus, an output display of a single recurrence of the input waveform 10 is formed on the face of the oscilloscope 22 during the second sweep.

The signal-to-noise ratio of the output display is enhanced, as generally indicated by the clean waveform 26, during the processing of the samplings of each successive sweep. This signal-to-noise ratio enhancement is obtained in accordance with the averaging principle by algebraically adding a correction factor during each sweep to the average amplitude information stored in each memory channel during the preceding sweep. The correction factor is derived for each sampling of each sweep as illustrated below for the case of the Jth sample of the Nth sweep, where the sample number is represented by a superscript and the sweep number by a subscript.

The sample and hold circuit 12 is connected to one input of a differential amplifier 28 for supplying thereto at time $T_1$ the data signal, $I_N^J$ produced during the Jth sampling. Similarly, the digital-to-analog converter 20 is connected to the other input of the differential amplifier 28 for supplying thereto at time $T_1$ an analogue average signal, $M_{N-1}^J$ which is indicative of the average amplitude information stored during the (N–1)th sweep in the memory address associated with the Jth sample and selected by the address register 18. The differential amplifier 28 provides an analogue difference signal $I_N^J - M_{N-1}^J$ indicating the difference between the data signal, $I_N^J$ and the analogue average signal, $M_{N-1}^J$. An analog-to-digital converter 30 is connected to the output of the differential amplifier 28 for converting this analogue difference signal, $I_N^J - M_{N-1}^J$, to an equivalent digital difference signal at time $T_3$ in response to an appropriate timing pulse from the timer 14. The equivalent digital difference signal is supplied to the arithmetic processor 21 which divides it by selected number and algebraically adds the resultant quotient signal as a correction factor to the average amplitude information stored during the (N–1)th sweep in the selected memory address associated with the Jth sample. This arithmetic processor 21 comprises a divide circuit 34 which is connected to the output of the analog-to-digital converter 30 for receiving the digital difference signal therefrom. In response to a selected timing pulse from the timer 14 at time $T_2$ the divide circuit 34 is set to divide the digital difference signal supplied thereto at time $T_3$ by the corresponding sweep number if the Nth sweep occurs within a preselected number of sweeps and by the preselected number if it occurs thereafter. An add or subtract circuit 36 is also included within the arithmetic processor 21 and is connected to the memory 16 for storing at time $T_1$ the digital average signal, $M_{N-1}^J$ which is indicative of the average amplitude information of the Jth sample stored during the (N−1)th sweep in the associated memory address. This add or subtract circuit 36 is also connected to the output of the divide circuit 34 for algebraically adding the digital quotient signal, $(I_N^J - M_{N-1}^J)/N$, assuming the Nth sweep occurs within the preselected number of sweeps, to the digital average signal, $M_{N-1}^J$ at time $T_4$ in response to a timing pulse from the timer 14. The output of the add or subtract circuit 36 is connected to the memory 16 for storing the corrected average amplitude information represented by the resultant average signal, $M_N^J = M_{N-1}^J + \frac{I_N^J - M_{N-1}^J}{N}$, back in the selected memory address associated with the Jth sample at time $T_5$ in response to a timing pulse applied to the memory 16.

As indicated above this feedback averaging system is provided with two operating modes during the initial one of which, hereinafter referred to as the stable averaging mode, the correction factors are obtained by dividing each digital difference signal by the corresponding sweep number and during the final one of which, hereinafter referred to as the decaying memory mode, they are obtained by dividing each difference signal by a constant, namely a preselected sweep number. This dual mode of operation is provided by connecting the output of a sweep counter 38 to the divide circuit 34 for supplying the division number to the divide circuit. The timer 14 is connected for supplying a timing pulse through a normally open AND gate 40 to the sweep counter 38 at time $T_1$, the beginning of each sweep, so that the sweep counter output increases sequentially with the number of sweeps. The preselected number of sweeps during which the feedback averaging system is to operate in the initial stable averaging mode is determined by manually actuating a sweep number switch 42. This initial stable averaging mode is terminated at the preselected number of sweeps by a comparator 44 which is connected for closing the normally open AND gate 40 so to prevent further increases in the sweep counter output when the sweep number stored in the sweep counter 38 equals the preselected number indicated by the sweep number switch 42.

The advantage of initially operating the feedback averaging system in the stable averaging mode is that a full-scale, online output display of the input waveform 10 is obtained during the second sweep and the greatest possible signal-to-noise ratio enhancement is achieved in the least possible time. This output display is not changed except to the extent of the attenuation of the noise component of the input waveform 10 during each sweep. The advantage of subsequently operating the system in the decaying memory mode is that the maximum degree of signal-to-noise ratio enhancement is increased by about three decibels. Moreover, once the feedback averaging system is operating in this exponentially decaying mode, obscured slowly varying waveforms may be observed if the time constant of the change in the obscured waveform is longer than the time constant of the decaying mode.

Figure 2:
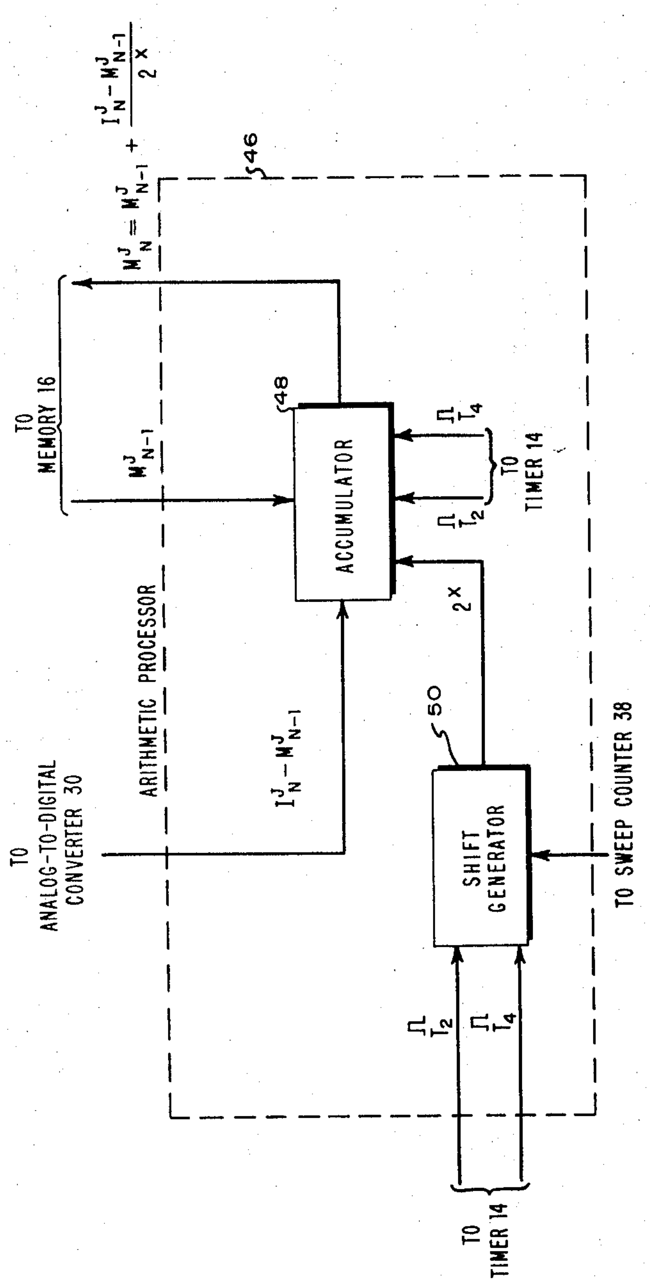
FIG. 2 is a block diagram of an arithmetic processor which may be used in place of the one shown in FIG. 1 to form a simplified feedback averaging system according to another embodiment of this invention.

Referring not to FIG. 2, there is shown another arithmetic processor 46 which may be substituted for the arithmetic processor 21 in FIG. 1 to provide in terms of hardware a simpler and less expensive feedback averaging system. Considering again for purposes of illustration the Jth sample of the Nth sweep, the operation and construction of this arithmetic processor 46 is described below. An accumulator 48, such as a reversible counter which may also serve as a shift register, is connected to the memory 16 for storing at time $T_1$ the digital average signal, $M_{N-1}^J$ which is indicative of the average amplitude information of the Jth sample stored during the (N−1)th sweep in the associated memory address. In the initial mode of operation of the feedback averaging system including the arithmetic processor 46, the digital difference signal, $I_N^J - M_{N-1}^J$, is divided by two raised to a power such that the division number, $2^x$, is determined by the relationship: $2^x$ N (the sweep number) $<2^{x+1}$. In accordance with this relationship, the value of the integer $x$ increases approximately logarithmically with increasing values of the sweep number N so that the difference in the value between $2^x$ and N is always less than $2^x$. The following chart shows the values of $2^x$ and $2^x$—where the sweep number N varies from one through ten;

| | | | | | | | | | | |
|---|---|---|---|---|---|---|---|---|---|---|
| $2^x$ | 1 | 2 | 2 | 4 | 4 | 4 | 4 | 8 | 8 | 8 |
| N | 1 | 2 | 3 | 4 | 5 | 6 | 7 | 8 | 9 | 10 |
| $2^{x+1}$ | 2 | 4 | 4 | 8 | 8 | 8 | 8 | 16 | 16 | 16 |

A shift generator 50 is responsive to the output of the sweep counter 38 at time $T_2$ for providing the appropriate division number $2^x$. Division by $2^x$ in a binary system may be accomplished by shifting the contents of an accumulator with conventional logic circuitry. Thus, the shift generator 50 is connected to the accumulator 48 for shifting the digital average signal $M^J_{N-1}$, stored therein $x$ places at time $T_2$ to provide the product, $(M^J_{N-1})(2^x)$ of the average signal and the division number, $2^x$. At time $T_3$ the digital difference signal, $I^J_N - M^J_{N-1}$, is supplied to the accumulator 48 where it is algebraically added to the product, $(M^J_{N-1})(2^x)$, by up/down counting to produce a resultant number $(M^J_{N-1})(2^x)+(I^J_N-M^J_{N-1})$.

Shift generator 50 then shifts this resultant number stored in the accumulator 48 back $x$ places at time $T_4$ to form a corrected average signal, $M^J_{N-1}+(I^J_N-M^J_{N-1})/2^x=M^J_N$. The accumulator 48 is connected to the memory 16 for storing this corrected average signal, $M^J_N$, at time $T_5$ in the selected memory address associated with the Jth sample. Since the arithmetic processor 46 algebraically adds each correction factor formed during each sweep to the average signal stored in the corresponding memory address during the preceding sweep merely by shifting and signed counting in the accumulator 48, the hardware requirements of the arithmetic processor 46 are greatly simplified. Although the signal-to-noise ratio enhancement efficiency falls off by about 9 percent, assuming a gaussian noise distribution, there are no arithmetic round-off errors in this simplifiedfeedback averaging system because division of the difference signal, $I_N{}^J - M^J_{N-J}$, is accomplished merely by shifting the contents of the accumulator 48. When the sweep number equals the preselected number indicated by the sweep number switch 42, the feedback averaging system operates in the decaying memory mode described above so as to divide the difference signals of each remaining sweep by the value of $2^x$ corresponding to the preselected sweep number.

I claim:

1. A method of enhancing the signal-to-noise ratio of a recurring input, said method comprising the steps of:
   - repetitively sweeping a selected interval of said input to produce at selected time positions in each sweep a data signal indicative of the amplitude of said input at that time position;
   - generating in response to the data signal produced at each time position of each sweep a difference signal related to the difference between that data signal and an average signal stored for any preceding sweep in a memory channel associated with the time position of that data signal;
   - registering in an accumulator for each time position of each sweep a number indicative of the average signal stored for any preceding sweep in the memory channel associated with the time position;
   - shifting the number registered for each time position of each sweep $x$ places in the accumulator;
   - adding by signed counting a number indicative of the difference signal produced for each time position of each sweep to the shifted number registered in the accumulator for that time position of that sweep and registering the resultant number for that time position of that sweep in the accumulator;
   - shifting the resultant number registered for each time position of each sweep back $x$ places in the accumulator to provide a corrected average signal for each time position of each sweep;
   - storing the corrected average signal for each time position of each sweep in the memory channel associated with that time positions; and
   - reading out the corrected average signal stored in each memory channel to provide an output in which the signal-to-noise ratio of said input is enhanced.

2. Apparatus for enhancing the signal-to-noise ratio of a recurring input, said apparatus comprising:
   - sweep means for repetitively sweeping a selected interval of said input to produce at selected time positions during each sweep a data signal indicative of the amplitude of said input at that time position;
   - storage means including a plurality of memory channels each of which is associated with a selected one of said time positions, said storage means being operable during each sweep for storing in each of said memory channels an average signal related to the data signal produced at the time position associated with that memory channel;
   - difference means connected to said sweep means and to said storage means, said difference means being operable during each sweep for producing for each of said time positions a difference signal related to the difference between the data signal produced at that time position and the average signal stored during any preceding sweep in the memory channel associated with that time position;
   - accumulating means connected to said storage means, said accumulating means being operable during each sweep for registering for each of said time positions a number indicative of the average signal stored during any preceding sweep in the memory channel associated with that time position;
   - control means connected to said accumulating means, said control means being operable during each sweep for causing the number registered by said accumulating means for each of said time positions to shift $x$ places;
   - said accumulating means being connected to said difference means and being operable during each sweep for adding by signed counting a number indicative of the difference signal produced by said difference means for each of said time positions to the shifted number registered by said accumulating means for that time position and for registering the resultant number for each of said time positions;
   - said control means being operable during each sweep for causing the resultant number registered by said accumulating means for each of said time positions to shift back $x$ places to provide a corrected average signal for each of said time positions;
   - said accumulating means being operable during each sweep for storing the corrected average signal for each of said time positions in the memory channel associated with that time position; and
   - indicator means connected to said storage means, said indicator means being operable for indicating the corrected average signals stored in said memory channels to provide an output in which the signal-to-noise ratio of said input is enhanced.

UNITED STATES PATENT OFFICE

CERTIFICATE OF CORRECTION

Patent No. 3,557,354 Dated January 19, 1971

Inventor(s) Charles R. Trimble

It is certified that error appears in the above-identified patent and that said Letters Patent are hereby corrected as shown below:

Column 1, line 42, cancel "Pats." and substitute -- Pat. --; line 44, immediately after "to" insert -- a --; line 47, cancel "online" and substitute -- on-line, --;

Column 2, line 25, immediately after "10" insert -- in --;

Column 4, line 26, cancel "online" and substitute -- on-line --; line 40, cancel "not" and substitute -- now line 56, cancel "$2^x$ N" and substitute -- $2^x \leq N$ --; line cancel "$2^x$ and $2^x$ ——" and substitute -- $2^x$ and $2^{x+1}$ --;

Column 5, line 28, cancel "simplifiedfeedback" and substitute -- simplified feedback --; line 52, cancel "with the time position" and substitute -- with that time position --.

Signed and sealed this 22nd day of June 1971.

(SEAL)
Attest:

EDWARD M.FLETCHER,JR.
Attesting Officer

WILLIAM E. SCHUYLER, JR.
Commissioner of Patents